Jan. 10, 1956 F. C. HUYSER 2,729,869
GRIPS FOR USE IN TENSION TESTING MACHINES
Filed Sept. 14, 1951 3 Sheets-Sheet 1

INVENTOR.
FRANCIS C. HUYSER
BY
ATTORNEY

Jan. 10, 1956        F. C. HUYSER        2,729,869

GRIPS FOR USE IN TENSION TESTING MACHINES

Filed Sept. 14, 1951        3 Sheets-Sheet 2

INVENTOR.
FRANCIS C. HUYSER
BY
*Bruce C. Lechler*
ATTORNEY

Jan. 10, 1956      F. C. HUYSER      2,729,869
GRIPS FOR USE IN TENSION TESTING MACHINES

Filed Sept. 14, 1951      3 Sheets-Sheet 3

*INVENTOR.*
FRANCIS C. HUYSER
BY

ATTORNEY

United States Patent Office 2,729,869
Patented Jan. 10, 1956

2,729,869
GRIPS FOR USE IN TENSION TESTING MACHINES

Francis C. Huyser, Moline, Ill., assignor to American Machine and Metals, Inc., New York, N. Y., a corporation of Delaware Application September 14, 1951, Serial No. 246,683

7 Claims. (Cl. 24—263)

The invention relates to an improvement in grips or wedges used in universal testing machines to hold the ends of a specimen during a tension test. Quite generally the specimen is held between wedges whose inner faces are parallel and whose outer faces slide on the inclined surfaces of openings in the stationary and movable heads of the testing machine. In order to get sufficient pressure against the specimen to prevent it from slipping in the grips, a powerful wedging action is needed. To secure this the slope of the inclined surfaces against which the inclined surface of the wedge bears is made small. Since the height or thickness of the heads permits only a limited vertical adjustment of the wedges, it becomes necessary to provide fillers which can be inserted between the wedges and the inclined surfaces of the head to accommodate specimens of various thickness. To allow the use of wedges appropriate to the cross sections of the specimen being tested, the wedges must be readily interchangeable.

Although the wedges must be removable from the head they must be held supported therein at all times to permit the operator to use both hands in adjusting the specimen.

When the specimen is to be released, the operator must be able to draw the wedges back and away from the specimen to release it. This may require an appreciable force.

During a test the entire force which is applied to the specimen is transmitted from the head through the inclined surfaces of the wedge and this force is balanced by the pull on the specimen. When the specimen ruptures, and this pull is lost, there is a tendency for the wedges to jump out of the head. Accordingly it is necessary to provide means which, while not interfering with the manual operation of the wedges, will check the possibility of the wedges being thrown out forcibly. To achieve these ends, the wedge grips have at times carried a rack meshing with a pinion carried by the head.

The invention provides wedges of simple form which can be made of a quality of steel that can be readily hardened and these wedge grips are moved by separate rack plates that are not brittle. These rack plates guide the wedge grips in a direction parallel to their inclined faces. The rack plates are moved by a manually operated pinion. A friction brake is provided with which this manually operated pinion can be engaged after the specimen has been clamped in the head. This friction brake is intended to absorb the major part of the recoil energy. This prevents the sudden turning of the pinion and allows the grips a restricted movement if the specimen breaks but prevents them from being thrown out of the head.

One object of the invention is to provide wedge grips interchangeably supported on a rack operated device which simultaneously moves the wedge grips apart and upward.

Another object of the invention is to provide a pair of wedge grips actuated by racks rolling on a pinion and also having an axial movement along the pinion.

Another object of the invention is to provide wedge grips whose movement can be restrained at will by a friction brake.

Figure 1:
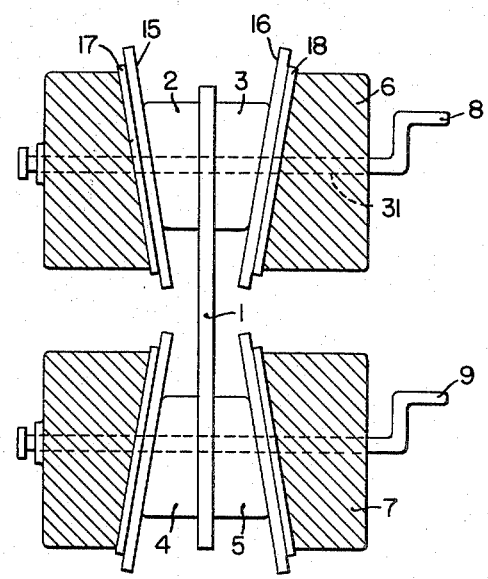
Fig. 1 shows diagrammatically grips for holding tension specimens, the grips incorporating the invention.

Referring first to Fig. 1 a typical tension specimen 1 is held between a pair of wedge grips 2, 3 at one end and is held at its other end between a similar pair of wedge grips 4 and 5. These wedge grips are supported against the tapered walls of openings in the heads 6 and 7. Either one of these heads may, in practice, be the stationary head and the other the movable head to which the force which is to be transmitted to the specimen is applied through the wedge grips. These wedge grips are moved in a manner to be more fully described along the tapered walls of these openings by mechanism connected with the crank handles 8 and 9. Since the construction of the gripping mechanism in the two heads is identical, only the mechanism in head 6 will be described.

To those familiar with the art it will be clear that the invention may be applied to any type of head. Two such typical types of heads are shown.

The type shown in Figs. 2 to 5 shows the invention adapted to a head 6 having a hole extending through the head. This type will be discussed first.

Figure 6:
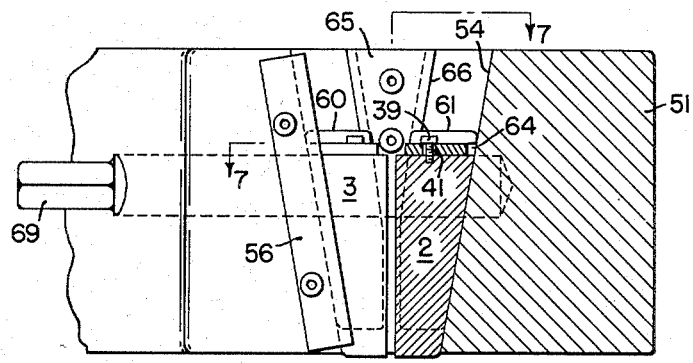
Fig. 6 is a vertical elevation partly in section of one of the heads shown in Fig. 1 drawn to an enlarged scale which shows the invention applied to another type of head. This is taken along line 6—6 in Fig. 7.
Figure 7:
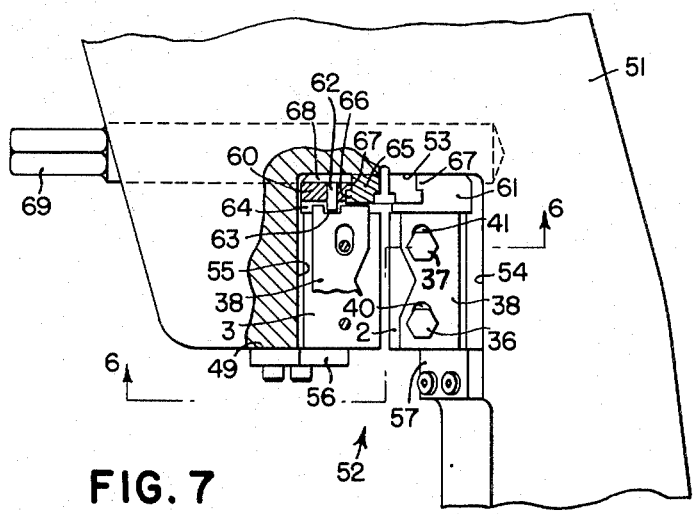
Fig. 7 is a plan view partly in section taken along line 7—7 in Fig. 6.

In the other type of head shown in Figs. 6 and 7 which is popular for use with smaller specimens calling for lighter loads, a slot extending into the head carries the wedge grips and their associated parts.

The head 6 is pierced by a large opening having two parallel sides 11 and 12 and two tapered sides 13 and 14. The wedge grips 2 and 3 bear against guide plates 15 and 16. These guide plates may bear against the surfaces 13 and 14 or they may be spaced therefrom by spacer plates 17 and 18. As will be seen by reference to Figs. 3 and 4, each end of the guide plate has a lateral projection 20 which prevents the guide plate from falling through the opening in the head 6. The guide plate may further be held against the inclined surface 13 or 14 by a screw 21 passing through the head and having a thumb nut 22 or the like at the outside of the head.

Figure 2:
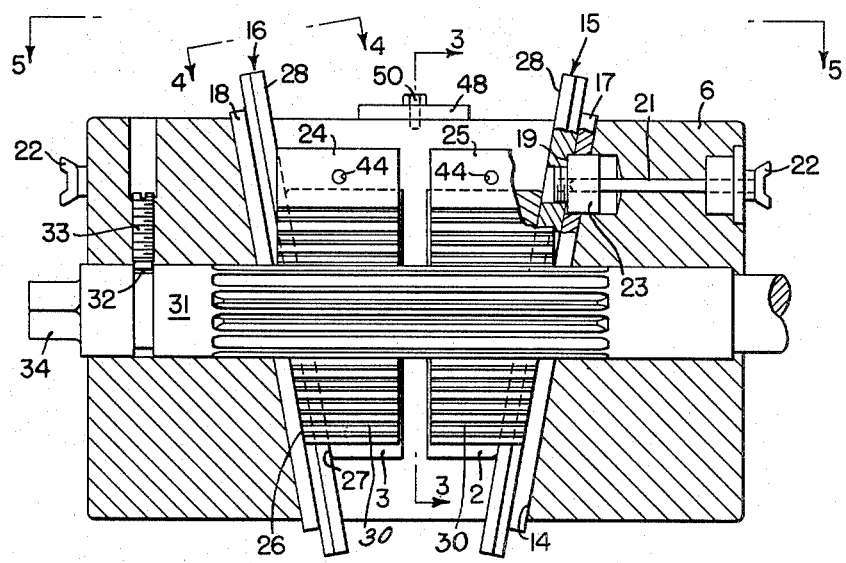
Fig. 2 is a vertical section through one of the heads shown in Fig. 1 drawn to an enlarged scale and taken along line 2—2 in Fig. 5.
Figure 3:
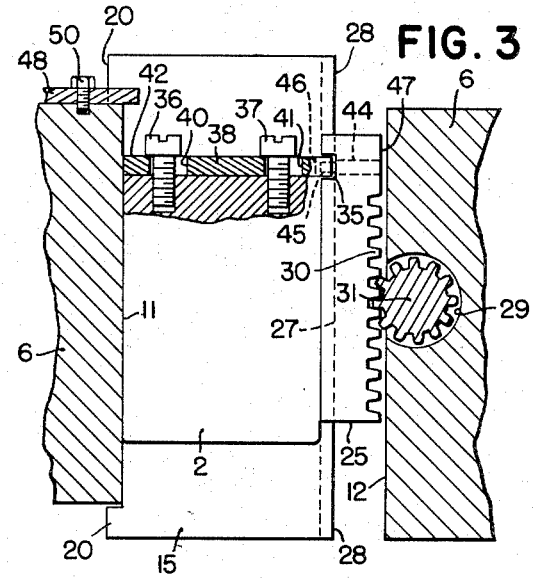
Fig. 3 is a vertical section taken along line 3—3 in Fig. 2.
Figure 4:
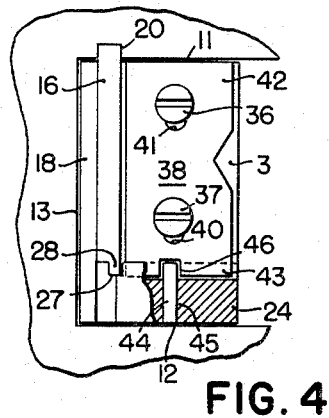
Fig. 4 is a fragmentary plan view taken along line 4—4 in Fig. 2, partly in section.
Figure 5:
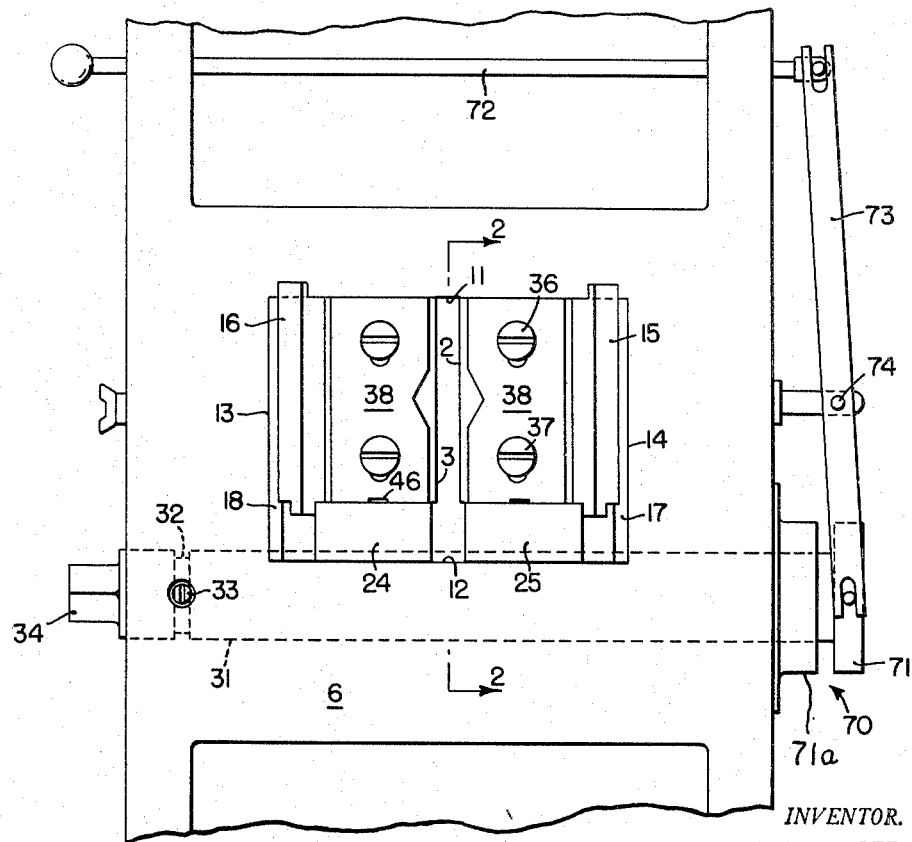
Fig. 5 is a plan view taken along line 5—5 in Fig. 2.

This screw may be threaded into a housing 23 which in turn is threaded into the guide plate 15 as shown at the right in Fig. 2. The bushing 23 has a shoulder 19 on which the spacer plate 17 and any other spacer plates are supported. The tightening of screw 21 will therefore hold the guide plates and the spacer plates in place. As will be seen from Fig. 4, one edge of the wedge grip 3 bears against surface 11 and a rack plate 24 fills the space between the other edge of the grip and the surface 12. There are two rack plates 24, 25 similar in all respects except that they form left and right hand members of a pair. Each rack plate has a sloped surface 26 and a groove 27 parallel thereto. The guide plates 15 and 16 have a tongue portion 28 which fits into this groove. Thus, as the rack plate is moved up and down this groove, the tongue 28 will cause it to move parallel to the surface 13.

The front face of each rack plate as seen in Fig. 2 has rack teeth 30 cut therein. These mesh with a pinion 31 which extends through a bore 29 in the end head 6. This supports the pinion at both sides of the opening in the head 6. This pinion may have a groove 32 into which a set screw 33 projects. The end of the pinion shaft may be squared at 34. The handles 8 and 10 carry squared bores that fit over this end of the respective pinions.

The rack plates may be made of a steel that is readily machineable while the wedge grips 2 and 3 may be made of steel suitable for hardening. In order to cause the wedge grips to move with the rack plates, a horizontal groove 35 is cut in the back of the rack plate. The upper end of the wedge grip carries two studs 36, 37 which extend through slots 40, 41 in a sliding plate 38 whose end 42 bears against the surface 11 and whose end 43 projects into the groove 35 in the rack plate. Thus the wedge is compelled to move vertically with the rack plate. To assure that the wedge also moves horizontally as the rack plate moves back in sliding along the tapered surface 13, the rack plate is bored at 44 and a pin 45 therein projects into a slot 46 in the plate 38. The vertical movement of the rack is limited by the land 47 when the rack is moving downward and by a stop plate 48 which may be attached to the head 6 by a bolt 50 when the rack in head 6 is moving up.

In the modified form shown in Figs. 6 and 7 the head 51 has a slot generally indicated at 52. The rear side 53 of this slot is vertical; so is the surface 49. The other two sides of the slot 54, 55 are tapered as in the head previously described. The wedge grips bear directly against the surfaces 54, 55. Each wedge grip carries at its upper end studs 36, 37 which pass through the slots 40, 41 in sliding plates 38 as in the first embodiment.

To prevent the wedge grip sliding out of the slot a plate 56 is bolted against the surface 49 and a strip 57 is bolted against the inclined surface 54. In this manner the two wedge grips are held in contact with two rack plates 60, 61. Each of these rack plates carries a pin 62 which enters a slot 63 in the plate 38. The purpose of these pins is to assure that the wedge grips will move not only vertically but also horizontally with the rack plates.

Each rack plate has a horizontal slot 64 into which the end of the plates 38 fit.

The rack plates are constrained to move parallel to the surfaces 54, 55 by a wedge shaped piece 65 which is fastened to the rear face 53 of the slot. This wedge shaped piece carries tongues 66 at its two edges. The wedge grips are so shaped that a tongue 67 of the rack plate is engaged by the tongue in the wedge shaped piece.

Each rack plate carries a rack with horizontal teeth 68 which mesh with a pinion 69 supported in the manner previously described.

If it becomes necessary to exchange grips in either of the two embodiments of the invention described, the grips are elevated by turning the handle 8 until the plate 38 is above the surface of the head 6 or 51. The slot 41 now permits the plate 38 to be slipped away from the rack plate and the grips may be lifted out of the machine and exchanged for other grips. When the proper grips have been installed in the machine, and the specimen is in place, the pinion is turned so that the rack plates will force the wedge grips along the tapered sides to compress the wedge grips against the specimen.

When the specimen breaks, especially in large testing machines, there is a large recoil which tends to throw the grips upward from head 6 and downward from head 7. This force will be great enough to break off the stop plate 48 or the plate 38. To prevent this, a brake 70 supported in the head is clutched to the end of pinion 31 which in this case must be extended clear through the head after the specimen has been clamped. This brake may have a clutch collar 71 and the brake may be so designed that when the collar 71 is moved toward the head 6 the portions revolving with the pinion shaft will be frictionally engaged by the stationary parts of the brake secured in a housing 71a. In the form shown, the clutch collar 71 may comprise the outer race of a bearing. The inner race thereof may comprise an operating part of several commercially known clutches, for example the twin disc clutch, which has parts that rotate with a shaft and other stationary parts which may be engaged by axial movement of the collar 71. The brake is adapted to be manually engaged by means of a push rod 72 supported in a hole bored in the head. The arm 73 pivoted at 74 is moved by rod 72 and engages collar 71. When the specimen has been put in place and the pinion 31 turned to tighten these grips, the rod 72 is pushed to the right in Fig. 5 and the arm 73 will engage the brake 70 so that when the specimen breaks, the pinion 31 will be prevented from rotating rapidly and be able to resist a large force which is created when the specimen is broken, thus preventing the grips from flying out of the opening.

What I claim:

1. Specimen supporting means comprising, a testing machine head having an opening with two inclined opposed surfaces, a plate lying against each surface, a tongue along one edge of each of said plates, a pair of wedge grips bearing against said plates respectively and adapted to engage a specimen between them, rack plates in said opening each having a groove in which the tongue of one of said plates slides, means connecting each of said rack plates to one of said wedge grips, and a single pinion carried by the head for moving both rack plates simultaneously.

2. Specimen supporting means comprising, a testing machine head having an opening with two inclined opposed surfaces, a plate lying against each surface, a tongue along one edge of each of said plates, a pair of wedge grips bearing against said plates respectively and adapted to engage a specimen between them, wedge supporting plates in said opening each having a groove in which the tongue of one of said first named plates slides, means connecting each of said wedge supporting plates to one of said wedge grips, means carried by the head for moving both wedge supporting plates simultaneously, and a friction clutch supported by said head adapted to be coupled to said wedge supporting plate moving means.

3. Specimen supporting means adapted to absorb recoil comprising, a testing machine head having an opening with two inclined opposed surfaces, a plate lying against each surface, a tongue along one edge of each of said plates, a pair of wedge grips bearing against said plates respectively and adapted to engage a specimen between them, rack plates in said opening each having a groove in which the tongue of one of said plates enters, means connecting each of said rack plates to one of said wedge grips, a single pinion carried by the head meshing with said rack for moving both wedge grips simultaneously, a friction device engaging said pinion shaft during a test to absorb the energy of recoil.

4. Specimen supporting means comprising a testing machine head having an opening which has two inclined opposed surfaces and two parallel vertical surfaces, an inclined plate lying against each inclined surface, a tongue extending along one edge of each of said plates, two wedge grips bearing against said plates respectively and adapted to engage a specimen between them, rack plates located between said wedge grips and one of said vertical faces of said opening, each rack plate having a groove in which the tongue of one of said inclined plates enters, a horizontal groove on said rack plates, means carried by each of said wedge grips which enters said horizontal groove of a rack plate to transmit vertical motion to the wedge grip, horizontal rack teeth on said rack plates, and a pinion carried by the head for moving both rack plates simultaneously.

5. Specimen supporting means comprising a testing machine head having an opening which has two inclined opposed surfaces and two parallel vertical surfaces, an inclined plate lying against each inclined surface, a tongue extending along one edge of each of said plates, two wedge grips bearing against said plates respectively and adapted to engage a specimen between them, rack plates located between said wedge grips and one of said vertical faces of said opening, each rack plate having a groove in which the tongue of one of said inclined plates enters, a horizontal groove on said rack plates, means carried by each of said wedge grips which enters said horizontal groove of a rack plate to transmit vertical motion to the wedge grip, horizontal rack teeth on said rack plates, a pinion carried by the head for moving both rack plates simultaneously, a friction clutch element anchored on said head, another friction clutch element connected to said pinion, means adapted to engage said two elements.

6. Specimen supporting means comprising a testing machine head having an opening which has two inclined opposed surfaces and two parallel vertical surfaces, a plate lying against each inclined surface, a tongue extending along one edge of each of said plates, two wedge grips bearing against said plates respectively and adapted to engage a specimen between them, rack plates located between said wedge grips and one of said vertical faces of said opening, each rack plate having a groove into which the tongue of one of said inclined plates enters, a horizontal groove on said rack plates, a plate slidably supported on a horizontal surface of each wedge grip adapted to enter said horizontal grooves so that the wedge grip and rack plate move in unison, horizontal rack teeth on said rack plates, and a pinion engaging said rack teeth carried by the head for moving both rack plates simultaneously.

7. Specimen supporting means comprising a testing machine head having an opening which has two inclined opposed surfaces and two parallel vertical surfaces, a plate lying against each inclined surface, a tongue extending along one edge of each of said plates, two wedge grips bearing against said plates respectively and adapted to engage a specimen between them, rack plates located between said wedge grips and one of said vertical faces of said opening, each rack plate having a groove into which the tongue of one of said inclined plates enters, a horizontal groove on said rack plates, a plate slidably supported on a horizontal surface of each wedge grip adapted to enter said horizontal groove so that the wedge grip and rack plate move in unison, horizontal rack teeth on said rack plates, a pinion carried by the head for moving both rack plates simultaneously, a stationary friction clutch element supported by said head, another friction clutch element connected to said pinion, and means adapted to engage said two elements to reduce the speed of the shaft.

References Cited in the file of this patent

UNITED STATES PATENTS

| | | |
|---|---|---|
| 1,750,822 | Spalding | Mar. 28, 1930 |
| 1,755,424 | Carroll | Apr. 22, 1930 |
| 1,872,105 | Black | Aug. 16, 1932 |
| 1,943,931 | Ruch | Jan. 16, 1934 |
| 2,317,826 | Templin | Apr. 27, 1943 |
| 2,350,577 | Vordahl | June 6, 1944 |
| 2,449,955 | Sanderson | Sept. 21, 1948 |
| 2,537,322 | Wanzenberg | Jan. 9, 1951 |